United States Patent [19]

Parfitt

[11] 4,324,197
[45] Apr. 13, 1982

[54] INSTRUMENT ASSEMBLY

[76] Inventor: Ronald H. Parfitt, 88 Broadway, Letchworth, Hertfordshire, England

[21] Appl. No.: 176,730

[22] Filed: Aug. 11, 1980

[51] Int. Cl.³ ............................................. G01D 13/22
[52] U.S. Cl. .................................... 116/300; 116/316; 324/157; 338/196
[58] Field of Search ............... 116/300, 301, 309, 316, 116/284, 307, 319, 320, 280; 324/157; 338/196

[56] References Cited

U.S. PATENT DOCUMENTS

| 2,786,924 | 3/1957 | Kronmiller | 338/196 |
| 3,831,090 | 8/1974 | Woolner | 324/157 |
| 4,142,149 | 2/1979 | Nador | 324/157 |

FOREIGN PATENT DOCUMENTS 1358746 7/1974 United Kingdom .
1380031 1/1975 United Kingdom .

Primary Examiner—S. Clement Swisher
Attorney, Agent, or Firm—Seidel, Gonda, Goldhammer & Panitch

[57] ABSTRACT

In an instrument assembly (1) a current value indicator element (6) is rotatably mounted on a shaft (5) and a set value indicator element (12) is controlled by a knob (14) and is mounted in the glass face (10) of the instrument for rotation about the axis of the shaft (5). Spur gears (9, 13) connect the set value indicator element (12) to a shaft (8) serving as input to a signal outputting means (7).

7 Claims, 2 Drawing Figures

INSTRUMENT ASSEMBLY

BACKGROUND OF THE INVENTION

This invention relates to an instrument assembly.

It is often required that an instrument assembly should provide a visual indication of both the current value of a parameter and of the required or set value of the same parameter. The instrument assembly will usually also include the comparison devices, for example electronic circuitry, which serve to provide an input to the apparatus being controlled in accordance with the relationship of the current value of the parameter to the set value. For safety and aesthetic reasons it is desirable that the device should give as clear an indication as possible of the relationship of the current value and the set value at any instant in time and that the instrument assembly itself should be designed and constructed in such a way that there is as little potential obstruction to visibility as possible.

G. B. Patent 1,358,746 describes an instrument assembly in which two separate scales are provided and the two readings are taken at 180° apart.

G. B. Patent 1,380,031 describes an instrument assembly in which the current value indicator element is provided by the combination of a coloured arcuate strip and a slot in a rotating disc both of which are located behind the scale plate which itself has to be provided with an arcuate slot equal in length to the scale length.

SUMMARY OF THE INVENTION

In accordance with the present invention there is provided in an instrument assembly, the combination of a housing, a single scale fixedly mounted on a face of said housing, two value indicator elements mounted on said housing and rotatable independently of each other over the face of the scale and about a common axis, one of the indicator elements being a current value indicator element and the other of the indicator elements being a set value indicator element, means mounted within said housing and operatively connected to the current value indicator element for moving it to rotational positions around said axis in response to corresponding inputs to said means, signal output means mounted within said housing and means mechanically connecting said set value indicator element to said signal output means whereby to obtain a signal output corresponding to a given position of said set value indicator element.

Preferably the output of the current value indicator moving means and the input shaft of the signal output providing means do not both lie on said axis and it is particularly preferred that the current value indicator moving means have an output shaft lying on said axis and that the input shaft to the signal output providing means should lie parallel to and spaced from said axis, in which case it is further preferred that spur gear means should interconnect the said input shaft with the said value indicator element.

Where manual control of set value indicator element is to be provided on the instrument assembly of the invention it is further preferred that a control knob be fixed to the set value indicator element for rotation therewith about said axis.

In a particular embodiment of an instrument assembly according to the invention the current value indicator element moving means is a galvanometer and the signal output providing means is a potentiometer and the assembly may further comprise means for comparing the output from the potentiometer with the input to the galvanometer.

An instrument assembly in accordance with a more particular aspect of the invention comprises a housing having a fixed planar scale secured thereto, a protective window covering said scale plate, a galvanometer mounted in the housing on the side of said scale plate remote from the window and having the free end of its output shaft protruding through the scale plate substantially perpendicularly thereto, a current value indicator needle secured to the free end of said output shaft for rotation with said output shaft over the scale plate, a potentiometer mounted in the housing on the same side of the scale plate as the galvanometer and having an input shaft parallel to and spaced from the output shaft of the galvanometer and having a free end protruding through the scale plate, a set value indicator needle lying between said window and said current value indicator needle, a support boss mounting said current value indicator needle and journalled in said window for rotation about the axis of the output shaft of the galvanometer, and rotary drive means interconnecting the boss and said input shaft of the potentiometer.

Preferably said boss extends out through the window and has a control knob attached thereto, and, preferably also, said drive means is comprised of spur gears secured on said boss and said potentiometer input shaft.

One embodiment of the invention will now be described by way of example only, with reference to the accompanying drawings.

DETAILED DESCRIPTION OF THE EXEMPLARY EMBODIMENT

Figure 1:
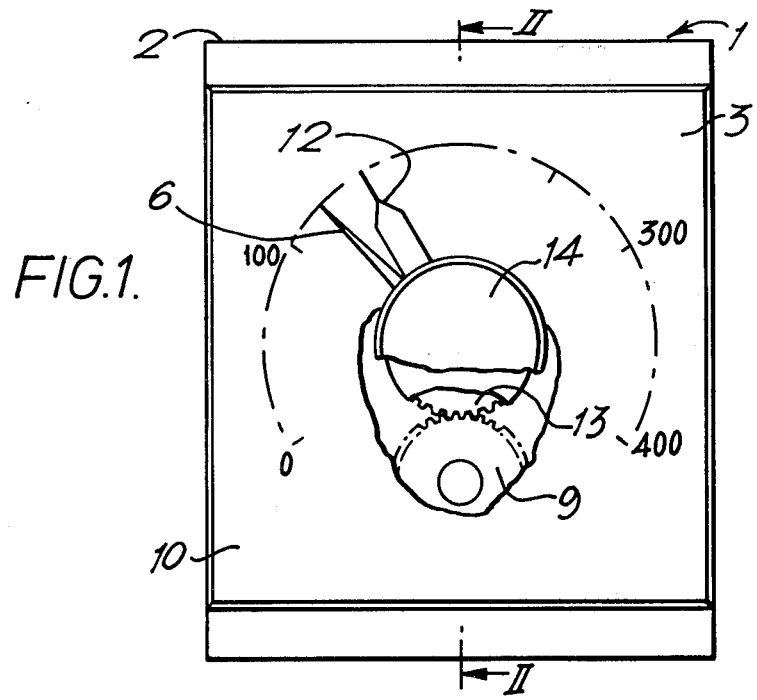
FIG. 1 is a front view of an instrument assembly for indicating and controlling the temperature of apparatus.
Figure 2:
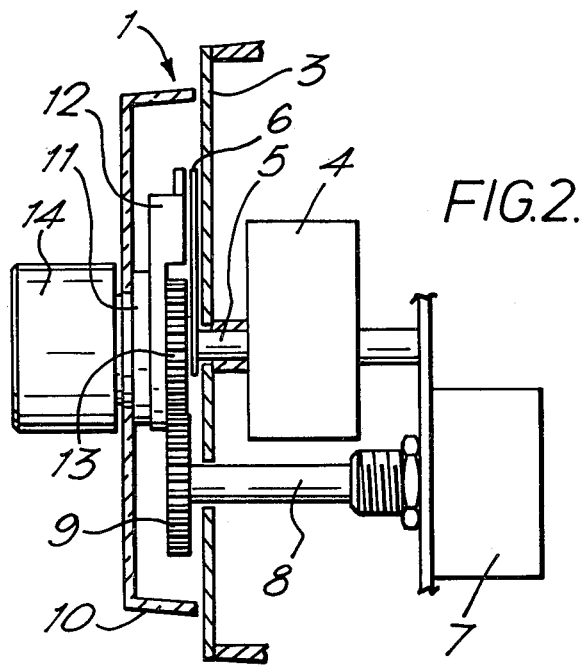
FIG. 2 is a schematic sectional view on line 2—2 of FIG. 1.

The drawings illustrating a specific embodiment of the invention to be described are somewhat schematic and do not illustrate the electrical input and output to the mechanical devices of the instrument assembly and they do not show the electronic circuitry associated with the instrument assembly.

In the instrument assembly 1 illustrated in the drawings there is provided a housing 2 which includes a front plate 3 which comprises on its outer face a circular planar scale which extends through approximately 270°.

A galvanometer 4 is mounted in the housing and has an output shaft 5 which is coincident with an axis extending centrally of and perpendicularly to the front plate 3. A current value indicator needle 6 is secured to the free end of the shaft 5 protruding through the scale plate 3 and is of a length to pass over the graduated portion of the scale. The needle 6 is a current value indicator element since the input to the galvanometer 4 will be proportional to the temperature of the apparatus being controlled.

A potentiometer 7 is also mounted within the housing 2 but is arranged to lie spaced from the axis of the output shaft 5 of the galvanometer and with its input shaft 8 parallel to the shaft 5. The free end of the input shaft of the potentiometer 7 also extends through the scale plate 3 and has a spur gear 9 secured to that free end.

A window plate 10 is mounted on the housing 2 over the scale plate 3 and encloses the free ends of the output shaft 5 of the galvanometer 4 and of the input shaft 8 of the potentiometer 7. A stepped boss 11 is mounted centrally of the window plate 10 and is journalled therein for rotation about the axis of the shaft 5 of the galvanometer 4. A set value indicator needle 12 is formed integrally with the boss 11 and has a length substantially equal to that of the needle 6 so that it is also rotatable about the axis of the shaft 5 over the graduated scale on the scale plate 3. A spur gear 13 is also secured to the boss 11 axially inwardly of the set value indicator 12 and is in engagement with the spur gear 9 on the input shaft 8 of the potentiometer 7. A control knob 14 is fixed on a portion of the boss 11 which protrudes through to the outside with respect to the window plate 10.

In operation of the instrument assembly shown in the drawings and described above, an electrical signal corresponding to the temperature of the apparatus being controlled is applied to the galvanometer 4 and the needle 6 moves into a corresponding position on the scale plate 3 by rotation about the axis of the shaft 5 and under the control of the shaft 5 of the galvanometer 4. The desired or set value of the temperature of the apparatus being controlled is established by manual rotation of the knob 14 until the set value indicator needle 12 lies in the desired position on the scale plate 3. Rotation of the knob 14 and the boss 11 causes rotation of the spur gear 13 attached thereto and corresponding rotation of the spur gear 9 and the input shaft 8 to the potentiometer 7 so as to establish a signal outut from the potentiometer 7 corresponding to the position of the set value indicator 12 over the scale plate 3. The instrument assembly contains electronic comparison circuitry which is not illustrated which produces an output from the instrument assembly for control of the apparatus is question related to the input to the galvanometer and the output from the potentiometer 7 and therefore to the relative positions of the current value indicator needle 6 and the set value indicator needle 12.

The instrument assembly as described provides for ready and accurate setting of the set value indicator element and ready comparison of this value with the current value indicator element 6 since they both rotate about the common axis and their position of coinicidence is easily discernible. In addition, the boss 11 has to support only the control knob 14 and the set value indicator needle 12 so that it does not have to be of large cross sectional dimensions and does not therefore present a substantial obstacle to the all round visibility of the current and set value indicators.

The use of spur gears provides a useful element of versatility within the instrument assembly since the reduction ratio can be varied from the 1:1 ratio shown in the present drawings to other ratios suitable for particular elements of the assembly.

I claim:

1. A control instrument comprising a housing, a single scale fixedly mounted on a face of said housing, two value indicator elements both positioned in front of said scale and rotatable independently of each other over the scale and about a common axis, one of the indicator elements being an actual value indicator element and the other of the indicator elements being a set-point indicator element, the scale having a series of graduations extending around at least 180° of a circle centered on said common axis, meter means mounted within said housing and operatively connected to the actual value indicator element for moving it to rotational positions around said axis in response to corresponding inputs to said meter means, control signal output means also mounted within said housing, a manually operable rotatable control knob centered on said axis and directly connected to said set-point indicator element for moving it to rotational positions around said axis so that the number of degrees of rotation of said set-point indicator element in response to a given amount of rotation of said control knob is the same regardless of the angular position of said set-point indicator element, and means mechanically connecting said set-point indicator element to said control signal output means to obtain a control signal output corresponding to a given position of said set-point indicator element.

2. A control instrument as in claim 1, wherein said meter means has an output shaft coaxial with said axis and said control signal output means has an input shaft extending parallel to but not coaxial with said output shaft of said meter means.

3. A control instrument as in claim 2, wherein spur gear means positioned substantially in the plane of said indicator element interconnects said input shaft and a further shaft which extends from the rear of the control knob and carries the set-point indicator element, and wherein said output shaft carries said actual value indicator element.

4. A control instrument as in claim 1, wherein the meter means is a galvanometer and the control signal output means is a potentiometer.

5. A control instrument as in claim 1, which includes a window in front of said scale through which movement of both indicator elements over an arcuate range of substantially 270° is visible.

6. A control instrument assembly comprising a housing having a fixed planar scale plate secured thereto, a protective window covering said scale plate, meter means mounted in the housing on the rear side of said scale plate remote from the window and having the free end of its output shaft protruding forwardly through the scale plate substantially perpendicular thereto, the scale plate having a series of graduations extending around at least 180° of a circle centered on the axis of the meter output shaft, an actual value pointer secured to the free end of said meter output shaft for rotation with said output shaft over the scale plate, a potentiometer mounted in the housing on the same side of the scale plate as the meter means and having an input shaft parallel to and spaced from the output shaft of the meter means and having a free end protruding through the scale plate, a set-point pointer between said window and said actual value pointer, a support boss journaled in said window and mounting said set-point pointer for rotation about the axis of the output shaft of the meter means in front of the scale, and rotary gear means interconnecting the boss and said input shaft of the potentiometer.

7. A control instrument as in claim 6, wherein said boss extends outwardly through the window and has a rotary control knob attached thereto.

* * * * *